«12» United States Patent
Ishibe

(10) Patent No.: US 8,873,726 B2
(45) Date of Patent: Oct. 28, 2014

(54) TELEPHONE EXCHANGE SYSTEM, COMMUNICATION APPARATUS, TELEPHONE INCOMING CALL METHOD, AND NON-TRANSITORY COMPUTER READABLE MEDIUM STORING PROGRAM

(75) Inventor: Naoko Ishibe, Kawasaki (JP)

(73) Assignee: NEC Infrontia Corporation, Kawasaki-shi (JP)

( * ) Notice: Subject to any disclaimer, the term of this patent is extended or adjusted under 35 U.S.C. 154(b) by 0 days.

(21) Appl. No.: 13/505,774

(22) PCT Filed: Nov. 4, 2010

(86) PCT No.: PCT/JP2010/006490
§ 371 (c)(1),
(2), (4) Date: May 3, 2012

(87) PCT Pub. No.: WO2011/055539
PCT Pub. Date: May 12, 2011

(65) Prior Publication Data
US 2012/0213355 A1 Aug. 23, 2012

(30) Foreign Application Priority Data

Nov. 5, 2009 (JP) ................................ 2009-253573

(51) Int. Cl.
*H04M 3/42* (2006.01)
*H04Q 3/58* (2006.01)
*H04M 3/436* (2006.01)

(52) U.S. Cl.
CPC ....... *H04Q 3/58* (2013.01); *H04Q 2213/13091* (2013.01)
USPC ............. 379/201.01; 379/201.2; 379/201.04; 379/207.04; 379/207.05

(58) Field of Classification Search
USPC ............. 379/201.01, 201.02, 201.04, 201.07, 379/201.08, 207.04, 207.05, 251
See application file for complete search history.

(56) References Cited

U.S. PATENT DOCUMENTS 5,646,988 A 7/1997 Hikawa
2002/0031210 A1* 3/2002 Mohn et al. ............... 379/114.01

(Continued)

FOREIGN PATENT DOCUMENTS

CN 1502201 A 6/2004
CN 1703101 A 11/2005

(Continued)

OTHER PUBLICATIONS

International Search Report for PCT/JP2010/006490 dated Jan. 25, 2011.

(Continued)

*Primary Examiner* — Harry S Hong
(74) *Attorney, Agent, or Firm* — Sughrue Mion, PLLC

(57) ABSTRACT

A telephone incoming call control unit 21B of a communication apparatus B 20B counts the total number of incoming calls and the number of incoming calls for each communication type indicating the breakdown of incoming call operations, as incoming call history data 21B for each telephone terminal B 30B as a slave unit, retrieves the incoming call history data 21B upon arrival of an incoming call from a certain calling party for the telephone terminal B 30B, extracts incoming call history data on the calling party from which the telephone terminal has received the incoming call, transmits the data to the telephone terminal when the telephone terminal is in an idle state, and causes an indicator 31B of the telephone terminal to display the data. The telephone incoming call control unit 21B thereafter transmits the call signal to the telephone terminal.

18 Claims, 8 Drawing Sheets

(56) References Cited

U.S. PATENT DOCUMENTS

| | | |
|---|---|---|
| 2005/0018660 A1 | 1/2005 | Hayashi |
| 2008/0253544 A1 | 10/2008 | Brown et al. |

FOREIGN PATENT DOCUMENTS

| | | |
|---|---|---|
| CN | 101472248 A | 7/2009 |
| JP | 2-299387 A | 12/1990 |
| JP | 4-120922 A | 4/1992 |
| JP | 2001-111678 A | 4/2001 |
| JP | 2008-22241 A | 1/2008 |

OTHER PUBLICATIONS

Japanese Office Action for JP 2009-253573 dated Jan. 12, 2011.
Communication dated Apr. 22, 2013 from the European Patent Office in counterpart European application No. 10828100.7.
Office Action dated May 23, 2013; issued by the State Intellectual Property Office, P.R. China; in corresponding application No. 201080050011.0.

* cited by examiner

TELEPHONE EXCHANGE SYSTEM, COMMUNICATION APPARATUS, TELEPHONE INCOMING CALL METHOD, AND NON-TRANSITORY COMPUTER READABLE MEDIUM STORING PROGRAM

CROSS REFERENCE TO RELATED APPLICATIONS

This application is a National Stage of International Application No. PCT/JP2010/006490 filed Nov. 4, 2010, claiming priority based on Japanese Patent Application No. 2009-253573 filed Nov. 5, 2009, the contents of all of which are incorporated herein by reference in their entirety.

TECHNICAL FIELD

The present invention relates to a telephone exchange system, a communication apparatus, a telephone incoming call method, a telephone incoming call program, and a non-transitory computer readable medium storing the program.

BACKGROUND ART

Most of recent telephone terminals are configured to record the phone number of an incoming call from a calling party as an incoming call history to allow a user to confirm who has made the incoming call in the absence of the user. The telephone terminals are also configured to allow the user to select a desired calling party from the recorded incoming call history and to make a call to the selected calling party.

However, in order for the user of a telephone terminal to recognize the number of previous incoming calls from a certain calling party to the telephone terminal, it is necessary for the user to count the number of received calls from the calling party within a certain period in the incoming call history recorded in the telephone terminal of the user. This has been a burden to the user.

To avoid such a situation, Japanese Unexamined Patent Application Publication No. 2001-111678 (Patent Literature 1) proposes a telephone set having the following configuration. That is, upon arrival of an incoming call, information indicating whether the calling party of the incoming call is recorded in a telephone terminal as an incoming call history is retrieved. When the calling party is recorded, information indicating the calling party of the incoming call, the date and time of the previous incoming calls, and the presence or absence of communication during the previous incoming calls (information as to whether communication has been established, or whether a message has been recorded on an answering machine) is displayed on a screen of a display unit of the telephone terminal.

CITATION LIST

Patent Literature

[Patent Literature 1] Japanese Unexamined Patent Application Publication No. 2001-111678 (pp. 3-4)

SUMMARY OF INVENTION

Technical Problem

In the technique disclosed in Patent Literature 1, however, since the incoming call history is recorded in the telephone terminal of the user, the incoming call history cannot be recorded in case the telephone terminal is in a busy state or the like. In the case of Patent Literature 1, the previous incoming call dates and times are listed and displayed. This necessitates the user of the telephone terminal to count the number of incoming calls in order to recognize the number of previous incoming calls from the same calling party. Thus, it is difficult for the user to immediately recognize the number of the incoming calls.

For this reason, when the telephone terminal receives an incoming call from a client for a negotiation, an inquiry, or the like, for example, it is difficult for the user of the telephone terminal to recognize a failure to answer the incoming call due to conditions such as a busy state, handset (transmitter/receiver) off-hook, a failure, or the like of the telephone terminal. It is also difficult for the user of the telephone terminal to instantly recognize, upon receiving an incoming call, the number of times of previous failures to answer the incoming calls due to the absence of the user of the telephone terminal, for example.

As a result, even when the telephone terminal is ready to answer an incoming call to the telephone terminal after having received a number of incoming calls from the same client who is frustrated upon making calls many times for a negotiation, an inquiry, or the like, it is difficult for the user of the telephone terminal to instantly recognize that the client has made calls frequently. Accordingly, the user makes a normal response upon answering the incoming call, which may result in making the client more frustrated.

Upon receipt of the phone number with which the calling party of the incoming call has never been received, it is difficult for the user to recognize that the calling party is a new client, prior to responding to the calling party, despite the possibility of an inquiry from the new client who may order an item or the like.

The present invention has been made in view of the above-mentioned circumstances, and therefore has an object to provide a telephone exchange system, a communication apparatus, a telephone incoming call method, a telephone incoming call program, and a non-transitory computer readable medium storing the program that are capable of counting the number of incoming calls indicating a history of incoming calls to each telephone terminal, regardless of conditions, such as a busy state, handset off-hook, failure, and the like, and displaying, on the telephone terminal, the incoming call history (the number of incoming calls) from a calling party of the incoming call prior to response of the user of the telephone terminal, upon arrival of an incoming call to a certain telephone terminal.

Solution to Problem

A telephone exchange system according to an exemplary aspect of the present invention has the following configuration.

(1) A telephone exchange system including: a communication apparatus that controls communication between telephone terminals each connected as a slave unit; and the telephone terminals, in which the communication apparatus includes incoming call history data storing the total number of incoming calls and the number of incoming calls for each communication type indicating a breakdown of an incoming call operation, for each of the telephone terminals; upon detecting an incoming call from a certain calling party to the telephone terminal, the communication apparatus retrieves the incoming call history data on the telephone terminal prior to an operation of transmitting a call signal to the telephone terminal; the communication apparatus extracts incoming call history data on the calling party from which the telephone terminal has received the incoming call, and transmits the incoming call history data to the telephone terminal when the telephone terminal is in an idle state; and the communication apparatus transmits the call signal to the telephone terminal.

Advantageous Effects of Invention

A telephone exchange system, a communication apparatus, a telephone incoming call method, a telephone incoming call program, and a non-transitory computer readable medium storing the program according to exemplary embodiments of the present invention provide the following advantageous effects.

A first advantageous effect is that regardless of conditions, such as a busy state, handset off-hook, failure, absence, and the like, the number of incoming calls from each calling party in a previous period arbitrarily set by a user of each telephone terminal, as well as communication types indicating the breakdown of an incoming call operation, is counted for each telephone terminal, as the number of incoming calls. Further, upon arrival of an incoming call from a certain calling party to a telephone terminal, the number of incoming calls from the calling party of the counting target, as well as the number of incoming calls for each communication type indicating the breakdown of the incoming call operation, is displayed on the telephone terminal, before the user of the telephone terminal answers the call. This configuration enables the user of the telephone terminal to instantly confirm the number of previous incoming calls from the same calling party during the busy state or in the absence of the user, before answering the call. This allows the user to make a response with an apology like "I'm sorry you've had trouble contacting us", which eases the frustration of the calling party.

Similar to the first advantageous effect, a second advantageous effect is that regardless of conditions, such as a busy state, handset off-hook, failure, absence, and the like, the number of incoming calls from each calling party in a previous period arbitrarily set by a user of each telephone terminal is counted for each telephone terminal, as the number of incoming calls. Further, upon arrival of an incoming call from a certain calling party to the telephone terminal, the number of incoming calls from the calling party of the counting target is displayed on the telephone terminal before the user of the telephone terminal answers the call. This configuration enables the user of the telephone terminal to instantly determine whether the calling party has made the telephone incoming call for the first time. This allows the user to be prepared to make a response in consideration of the possibility of an inquiry or an order from a new client, for example.

DESCRIPTION OF EMBODIMENTS

Figure 1:
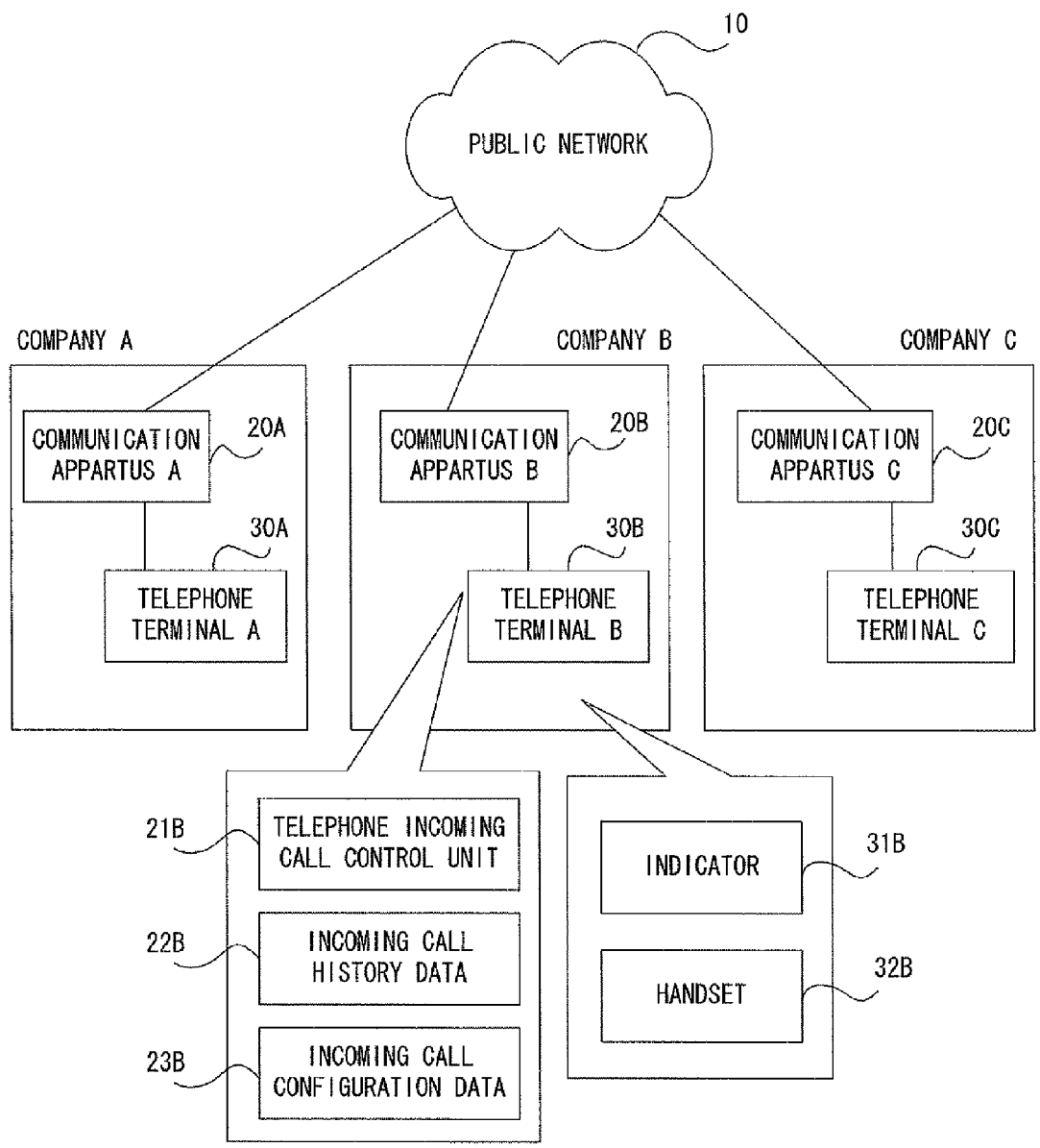
FIG. 1 is a system configuration diagram showing an exemplary system configuration of a telephone exchange system according to the present invention.

Hereinafter, exemplary embodiments of a telephone exchange system, a communication apparatus, a telephone incoming call method, a telephone incoming call program, and a program recording medium according to the present invention will be described with reference to the accompanying drawings. While the telephone exchange system, the communication apparatus, and the telephone incoming call method according to exemplary embodiments of the present invention are described below, the telephone incoming call method may be implemented as a telephone incoming call program executable by a computer, or the telephone incoming call program may be recorded in computer readable media.

Herein, the telephone exchange system according to an exemplary embodiment of the present invention includes at least a communication apparatus installed in a company, business facility, or the like, and a telephone terminal used by a user in the company, business facility, or the like. The communication apparatus is connected to, for example, a public network which provides public telephone services. Specifically, the communication apparatus is an apparatus that is installed in a company, business facility, or the like to perform communication via telephone, facsimile, and the like involving one or more telephone terminals each connected as a slave unit. Examples of the communication apparatus include a key telephone unit and a private branch exchange (PBX) system. The telephone terminal is a slave unit connected to the communication apparatus, such as a key telephone unit or a PBX system, and transmits/receives a telephone call, facsimile, or the like under the control of the communication apparatus.

Features of the Invention

Prior to the description of exemplary embodiments of the present invention, an outline of features of the present invention will be described. The main features of the present invention are as follows. According to an exemplary embodiment of the present invention, a communication apparatus that handles a telephone call and a fax call to each telephone terminal, which is a slave unit connected as an extension telephone set of a key telephone unit, a PBX system, or the like, records an incoming call history of the telephone terminal of the slave unit. Further, according to an exemplary embodiment of the present invention, upon arrival of an incoming call for any of the slave telephone terminals from a certain calling party, prior to transmission of a call signal to the telephone terminal, the communication apparatus retrieves the incoming call history data on the telephone terminal, calculates the total number of previous incoming calls from the calling party, as well as the number of incoming calls for each communication type including at least one of: the number of responded incoming calls for which a response has been made; the number of busy incoming calls which have been denied due to a busy state; the number of failure incoming calls which have been denied due to a handset (transmitter/receiver) off-hook state, a failure, or the like; and the number of not-responded incoming calls which have not been responded due to the absence of the user of the telephone terminal, for example, as communication types (breakdown) indicating operations upon receiving an incoming call. Furthermore, the communication apparatus transfers the calculated numbers, as well as the phone number of the calling party or the title or name of the calling party, to the telephone terminal, and displays them on an indicator of the telephone terminal.

Specifically, upon detection of an incoming call from a certain calling party to the telephone terminal connected to the communication apparatus, the communication apparatus enables transfer, to the telephone terminal, of the total number of incoming calls generated in a previous period (a set period of time such as the current day or a previous week) arbitrarily set by the user of the telephone terminal, as well as the number of busy incoming calls, the number of failure incoming calls, the number of not-responded incoming calls, the number of responded incoming calls, and the like, as the history of incoming calls to the telephone terminal of the calling party, for each item of the breakdown of the telephone terminal, such as a busy state or failure, absence, response, and the like, prior to the operation of transmitting a call signal to the telephone terminal. Further, the communication apparatus enables display of the numbers on the indicator of the telephone terminal.

This configuration enables the user of the telephone terminal to instantly recognize the incoming call history of the calling party of the incoming call in the previous period preliminarily set by the user of the telephone terminal, prior to making a response to the telephone incoming call in response to the call signal transmitted thereafter, and to determine how to make a response upon receiving an incoming call and determine whether it is possible to make a response to the coming call.

Note that setting of the period in which the number of previous incoming calls is counted (specifically, a count starting time and a count end time of the number of incoming calls) and setting of the communication types (breakdown of incoming call operation) indicating the number of incoming calls to be displayed on the indicator of the telephone terminal are determined by incoming call configuration data (system data) which is preliminarily set and registered for each slave telephone terminal connected to the communication apparatus. The incoming call configuration data can be arbitrarily set by the user of each telephone terminal.

For example, the period in which the number of previous incoming calls is counted for each telephone terminal may be limited such that only the incoming calls during the period of the previous one hour or the current day is counted. The entire period from the start of the system operation as the communication apparatus to the present time may be set. A period from an arbitrarily designated start date to an arbitrarily designated end date may be set. Alternatively, the telephone terminal may transmit a reset instruction at any time for each telephone terminal to reset and recount the number of previous incoming calls from "1". More alternatively, a calling party may be designated as a target for resetting the number of incoming calls. At least one of the total number of incoming calls, the number of incoming calls for each communication type (breakdown of incoming call operation), and the like may be arbitrarily selected and designated.

As the communication type (breakdown of incoming call operation) indicating the number of incoming calls to be displayed on the indicator of the telephone terminal, only the total number of incoming calls may be set to be displayed, without displaying the number of incoming calls for each communication type indicating the breakdown of the incoming call operation. Both the total number of incoming calls and the number of busy incoming calls may be set to be displayed. It is also possible to set the total number of incoming calls and the breakdown of all incoming call operations (the number of busy incoming calls, the number of failure incoming calls, the number of not-responded incoming calls, the number of responded incoming calls, and the like) to be displayed.

Configuration Example of Exemplary Embodiment of the Present Invention

Next, a configuration example of a telephone exchange system according to an exemplary embodiment of the present invention will be described in detail with reference to FIG. 1. FIG. 1 is a system configuration diagram showing an exemplary system configuration of the telephone exchange system according to an exemplary embodiment of the present invention. FIG. 1 illustrates a case where a public network 10 is connected with telephone systems of Company A, Company B, and Company C. The telephone system of Company A includes a communication apparatus A 20A, such as a key telephone unit or a PBX system, and a telephone terminal A 30A as a slave unit (extension telephone) used by a user in Company A. The telephone system of Company B includes a communication apparatus B 20B, such as a key telephone unit or a PBX system, and a telephone terminal B 30B as a slave unit (extension telephone) used by a user in Company B. The telephone system of Company C includes a communication apparatus C 20C, such as a key telephone unit or a PBX system, and a telephone terminal C 30C as a slave unit (extension telephone) used by a user in Company C.

Though FIG. 1 shows parts for carrying out telephone incoming processing of only the communication apparatus B 20B, the communication apparatus A 20A and the communication apparatus C 20C also have the same parts. Specifically, as shown in FIG. 1, the communication apparatus B 20B includes at least a telephone incoming call control unit 21B for controlling an incoming call operation via telephone or facsimile to each telephone terminal B 30B connected as a slave unit of the communication apparatus B 20B; incoming call history data 22B storing the number of incoming calls of telephone or facsimile to each telephone terminal B 30B connected as a slave unit; and incoming call configuration data 23B storing control data for defining the incoming call operation as system data for each telephone terminal B 30B. Although not shown in FIG. 1, the communication apparatus A 20A and the communication apparatus C 20C have the same configuration, and at least include telephone incoming call control units 21A and 21C, incoming call history data 22A and 22C, and incoming call configuration data 23A and 23C, respectively.

FIG. 1 only shows an indicator 31B for displaying various information on the screen, and a handset 32B for transmitting/receiving a call, each of which is included in the telephone terminal B 30B serving as a slave unit of the communication apparatus B 20B. However, the telephone terminal A 30A and the telephone terminal C 30C include indicators 31A and 31C and handsets 32A and 32C, respectively, having the same configuration.

Explanation of Operation of Exemplary Embodiment

Figure 2A:
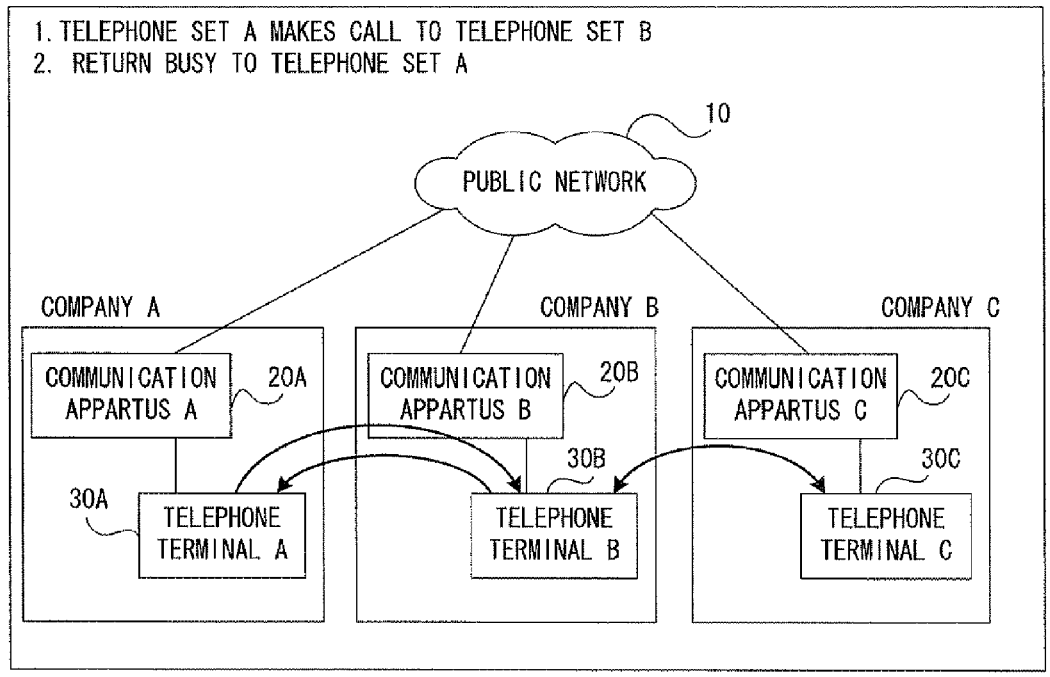
FIG. 2A is a schematic diagram showing a state where a telephone terminal B of a communication apparatus B receives incoming calls three times from a telephone terminal A of a communication apparatus A via a public network in the telephone exchange system shown in FIG. 1.
Figure 2B:
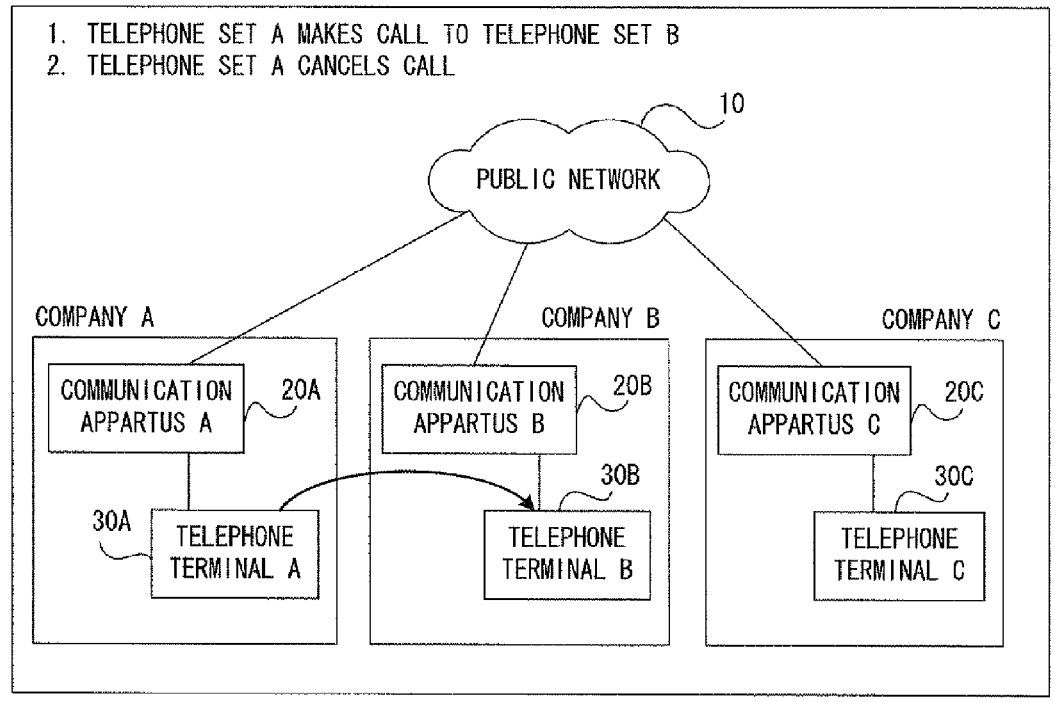
FIG. 2B is a schematic diagram showing a state where the telephone terminal B of the communication apparatus B receives incoming calls three times from the telephone terminal A of the communication apparatus A via the public network in the telephone exchange system shown in FIG. 1.
Figure 2C:
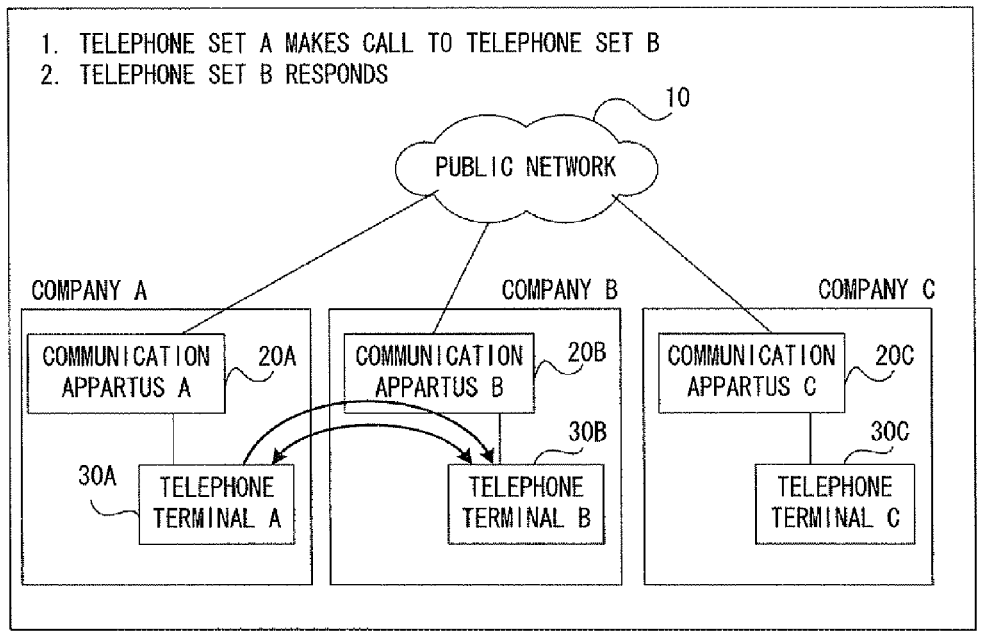
FIG. 2C is a schematic diagram showing a state where the telephone terminal B of the communication apparatus B receives incoming calls three times from the telephone terminal A of the communication apparatus A via the public network in the telephone exchange system shown in FIG. 1.

Next, an exemplary operation in the telephone exchange system shown in FIG. 1 will be described with reference to FIGS. 3A to 3C and FIGS. 4A to 4C, by illustrating three types of incoming call operations shown in FIGS. 2A to 2C. FIGS. 2A to 2C are schematic diagrams each showing a state where the telephone terminal B 30B in the communication apparatus B 20B has received telephone incoming calls three times from the telephone terminal A 30A in the communication apparatus A 20A via the public network 10 in the telephone exchange system shown in FIG. 1.

Referring to FIGS. 2A to 2C, FIG. 2A showing a first incoming call operation from the telephone terminal A 30A to the telephone terminal B 30B illustrates a case where the communication apparatus B 20B denies the incoming call and returns "BUSY" to the telephone terminal A 30A in the communication apparatus A 20A of the calling party, because the telephone terminal B 30B in the communication apparatus B 20B as the destination of the incoming call is in a busy state with the telephone terminal C 30 C of the communication apparatus C 20C.

FIG. 2B showing a second incoming call operation from the same telephone terminal A 30A to the telephone terminal B 30B after the incoming call operation shown in FIG. 2A illustrates a case where the telephone terminal A 30A in the communication apparatus A 20A of the calling party is disconnected to cancel the call after a call timeout due to the absence of the user of the telephone terminal B 30B in the communication apparatus B 20B as the destination of the incoming call.

FIG. 2C showing a third incoming call operation from the same telephone terminal A 30A to the telephone terminal B 30B after the incoming call operation shown in FIG. 2B illustrates a case where the communication apparatus B 20B as the destination of the incoming call has responded to the third incoming call from the telephone terminal A 30A for a while.

Figure 3A:
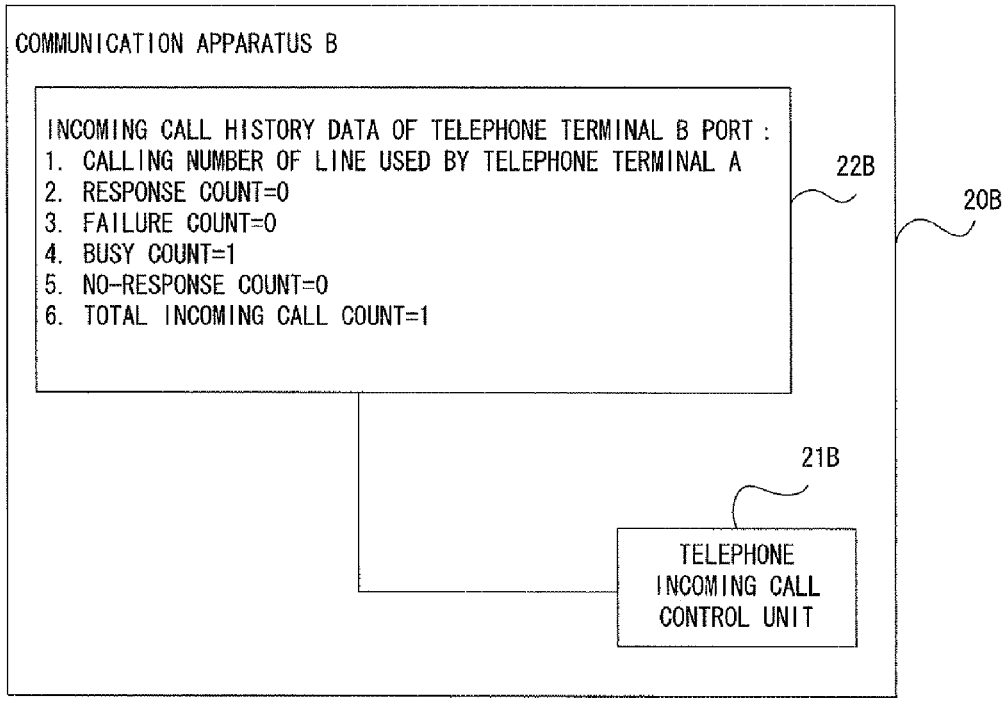
FIG. 3A is an explanatory diagram illustrating recorded contents of incoming call history data in the communication apparatus B when incoming call operations shown in FIGS. 2A to 2C are performed in the telephone exchange system shown in FIG. 1.

Next, the operation of recording incoming call history data in the communication apparatus B 20B when three types of incoming call operations shown in FIGS. 2A to 2C are performed will be described with reference to FIGS. 3A to 3 C and FIGS. 4A to 4C. FIGS. 3A to 3C are explanatory diagrams each illustrating recorded contents of the incoming call history data in the communication apparatus B 20B when the incoming call operations shown in FIGS. 2A to 2C are performed in the telephone exchange system shown in FIG. 1. FIGS. 4A to 4C are explanatory diagrams each illustrating the operation of recording the incoming call history data when the incoming call operations shown in FIGS. 2A to 2C are performed in the telephone exchange system shown in FIG. 1.

FIG. 3A shows recorded contents of the incoming call history data 22B updated by the telephone incoming call control unit 21B of the communication apparatus B 20B in the first incoming call operation shown in FIG. 2A. FIG. 3B shows recorded contents of the incoming call history data 22B updated by the telephone incoming call control unit 21B of the communication apparatus B 20B in the second incoming call operation shown in FIG. 2B. FIG. 3C shows recorded contents of the incoming call history data 22B updated by the telephone incoming call control unit 21B of the communication apparatus B 20B in the third incoming call operation shown in FIG. 2C. Assume that prior to the first incoming call operation shown in FIG. 2A, the telephone incoming call control unit 21B of the communication apparatus B 20B resets each of the total number of incoming calls and the number of incoming calls for each communication type to "0", for the number of incoming calls from the telephone terminal A 30A in the communication apparatus A 20A related to the telephone terminal B 20B among the numbers of previous incoming calls recorded in the incoming call history data 22B, depending on the set contents of the incoming call configuration data 23B.

FIG. 4A shows an operation sequence among an external line port from the telephone terminal A 30A in the communication apparatus B 20B, an extension port of the telephone terminal B 30B, and an external line port from the telephone terminal C 30C in the first incoming call operation shown in FIG. 2A. FIG. 4B shows an operation sequence between the external line port from the telephone terminal A 30A in the communication apparatus B 20B and the extension port of the telephone terminal B 30B in the second incoming call operation shown in FIG. 2B. FIG. 4A shows an operation sequence between the external line port from the telephone terminal A 30A in the communication apparatus B 20B and the extension port of the telephone terminal B 30B in the third incoming call operation shown in FIG. 2C.

First, the first incoming call operation shown in FIG. 2A will be described. As shown in FIG. 4A, the telephone terminal B 30B in the communication apparatus B 20B is already in the busy state with the telephone terminal C 30C in the communication apparatus C 20C via the extension port of the telephone terminal B 30B in the communication apparatus B 20B and the external line port of the telephone terminal C 30C in the communication apparatus C 20C. In this case (sequence Seq1), as the incoming call operation shown in FIG. 2A, when a first incoming call from the telephone terminal A 30A in the communication apparatus A 20A to the telephone terminal B 30B in the communication apparatus B 20B is generated via the external line port from the telephone terminal A 30A (sequence Seq2), the telephone incoming call control unit 21B of the communication apparatus B 20B denies the incoming call from the telephone terminal A 30A, and the telephone terminal B 30B as the destination of the incoming call returns "BUSY" to the telephone terminal A 30A of the calling party via the external line port from the telephone terminal A 30A (sequence Seq3).

After that, the telephone incoming call control unit 21B of the communication apparatus B 20B records the calling number (that is, the phone number specifying the telephone terminal A 30A of the calling party) of the line used by the telephone terminal A 30A of the calling party, as data indicating the incoming call history from the telephone terminal A 30A, in an area of the incoming call history data 22B in which the number of incoming calls related to the telephone terminal B 30 B is counted. The telephone incoming call control unit 21B of the communication apparatus B 20B increments, by "1", a total incoming call count "0" indicating the number of incoming calls from the telephone terminal A 30A of the calling party. The telephone incoming call control unit 21B of the communication apparatus B 20B increments, by "1", a busy count "0" indicating the number of denied incoming calls from the telephone terminal A 30A of the calling party due to the busy state, as a communication type upon receiving an incoming call. The telephone incoming call control unit 21B of the communication apparatus B 20B sets and registers the counts as "1". In this case, the other communication types including a response count, a failure count, and a no-response count remain the initial value "0".

In sum, in the incoming call history data 22B of the communication apparatus B 20B, the incoming call history data on the extension port of the telephone terminal B 30B is set as shown in FIG. 3A. That is, "1" indicating the first time is recorded as the total incoming call count (total number of incoming calls) indicating the total number of incoming calls, for the telephone terminal A 30A of the calling party, and "1" indicating the first time is recorded as the busy count (the number of busy incoming calls) indicating the number of denied incoming calls due to a busy state (BUSY) as the communication type of the incoming call operation. The numbers of incoming calls of the other communication types remain the initial value "0".

Next, the second incoming call operation shown in FIG. 2B will be described. As shown in FIG. 4B, when a second incoming call is generated from the telephone terminal A 30A in the communication apparatus A 20A to the telephone terminal B 30B in the communication apparatus B 20B as the incoming call operation shown in FIG. 2B (sequence Seq4), the telephone incoming call control unit 21B of the communication apparatus B 20B prepares to transmit a call signal to the telephone terminal B 30B via the extension port of the telephone terminal B 30B.

Prior to the operation of transmitting the call signal to the telephone terminal B 30B, the telephone incoming call control unit 21B of the communication apparatus B 20B retrieves the incoming call history data from the telephone terminal A 30A on the telephone terminal B 30B in the incoming call history data 22B, and extracts the calling number (that is, the phone number specifying the telephone terminal A 30A of the calling party) of the line used by the telephone terminal A 30A, which is recorded as the incoming call history data from the telephone terminal A 30A of the calling party; total incoming call count="1"; and response count="0", failure count="0", busy count="1", and no-response count="0" as the communication types (breakdown) of the incoming call operation recorded as the breakdown of the total incoming call count. Further, the telephone incoming call control unit 21B transmits the extracted counts to the telephone terminal B 30B. After that, the telephone incoming call control unit 21B of the communication apparatus B 20B transmits a call signal to the telephone terminal B 30B.

In this case, when the telephone terminal B 30B is in the state of being unable to answer the call signal due to the absence of the user of the telephone terminal B 30B, for example, no answer signal is returned from the communication apparatus B 20B, which is connected with the telephone terminal B 30B, to the communication apparatus A 20A, which is connected with the telephone terminal A 30A of the calling party, before the lapse of a predetermined period of time. Accordingly, the communication apparatus A 20A disconnects the telephone terminal A 30A to cancel the call originated from the telephone terminal A 30A, and transmits a signal indicating cancellation of the call to the communication apparatus B 20B via the external line port from the telephone terminal A 30A (sequence Seq5).

The telephone incoming call control unit 21B of the communication apparatus B 20B having received the signal indicating cancellation of the call from the communication apparatus A 20A stops transmission of the call signal to the telephone terminal B 30B.

After that, the telephone incoming call control unit 21B of the communication apparatus B 20B records the calling number (that is, the phone number specifying the telephone terminal A 30A of the calling party) of the line used by the telephone terminal A 30A of the calling party, as data indicating the incoming call history from the telephone terminal A 30A, in an area of the incoming call history data 22B in which the number of incoming calls related to the telephone terminal B 30B is counted. The telephone incoming call control unit 21B of the communication apparatus B 20B increments, by "1", the total incoming call count "1" indicating the number of incoming calls from the telephone terminal A 30A of the calling party. The telephone incoming call control unit 21B of the communication apparatus B 20B increments, by "1", the no-response count "0" indicating the number of incomplete calls due to no response to the incoming call from the telephone terminal A 30A of the calling party, as a communication type upon receiving an incoming call. The telephone incoming call control unit 21B of the communication apparatus B 20B sets and registers the counts as "2" and "1", respectively. As the other communication types, the busy count remains "1" as the counted-up value in the first incoming call operation, and the response count and the failure count remain the initial value "0".

Figure 3B:
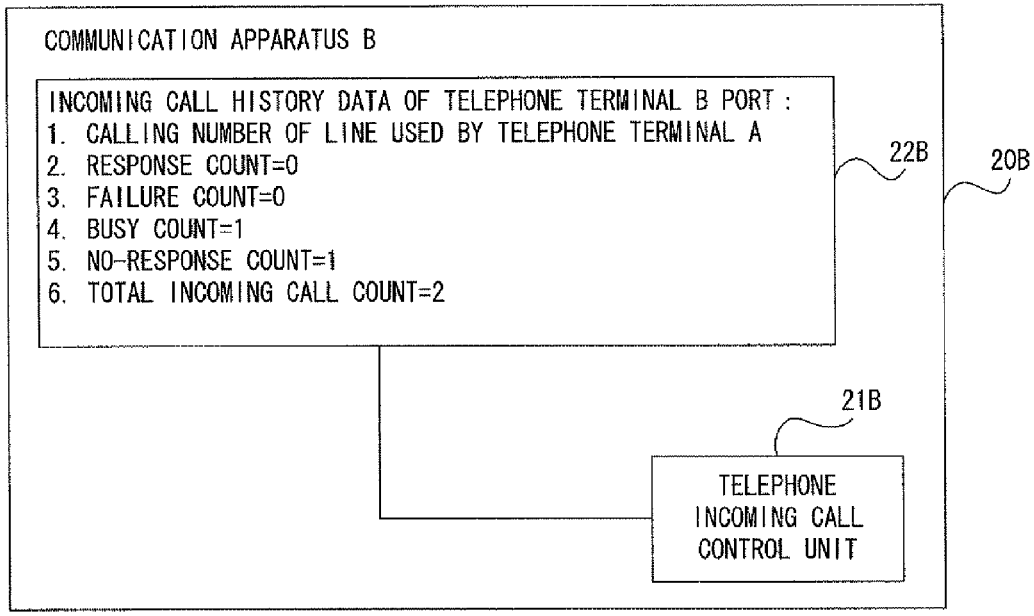
FIG. 3B is an explanatory diagram illustrating recorded contents of incoming call history data in the communication apparatus B when the incoming call operations shown in FIGS. 2A to 2C are performed in the telephone exchange system shown in FIG. 1.
Figure 4A:
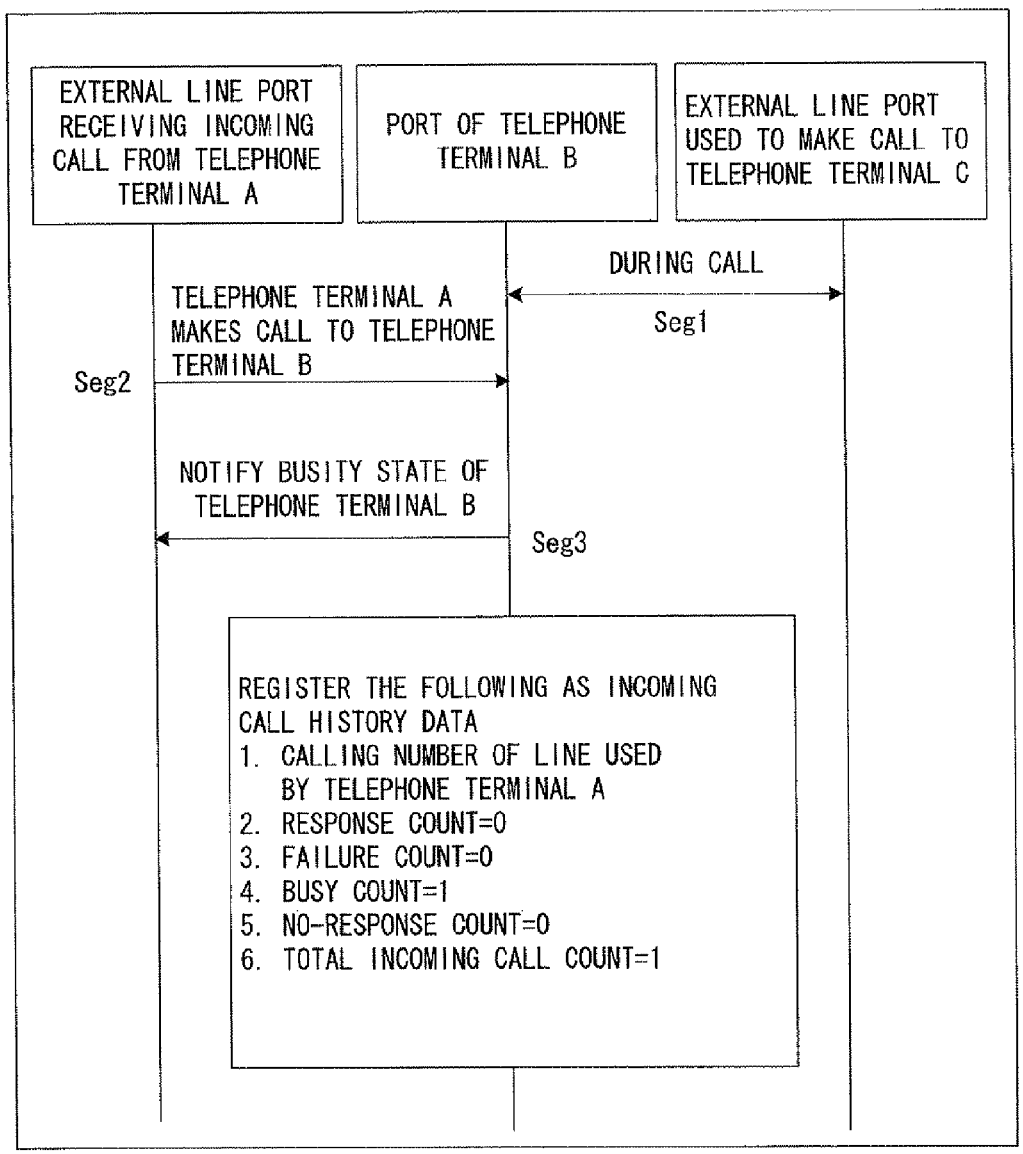
FIG. 4A is a sequence diagram illustrating an operation of recording incoming call history data when the incoming call operations shown in FIGS. 2A to 2C are performed in the telephone exchange system shown in FIG. 1.
Figure 4B:
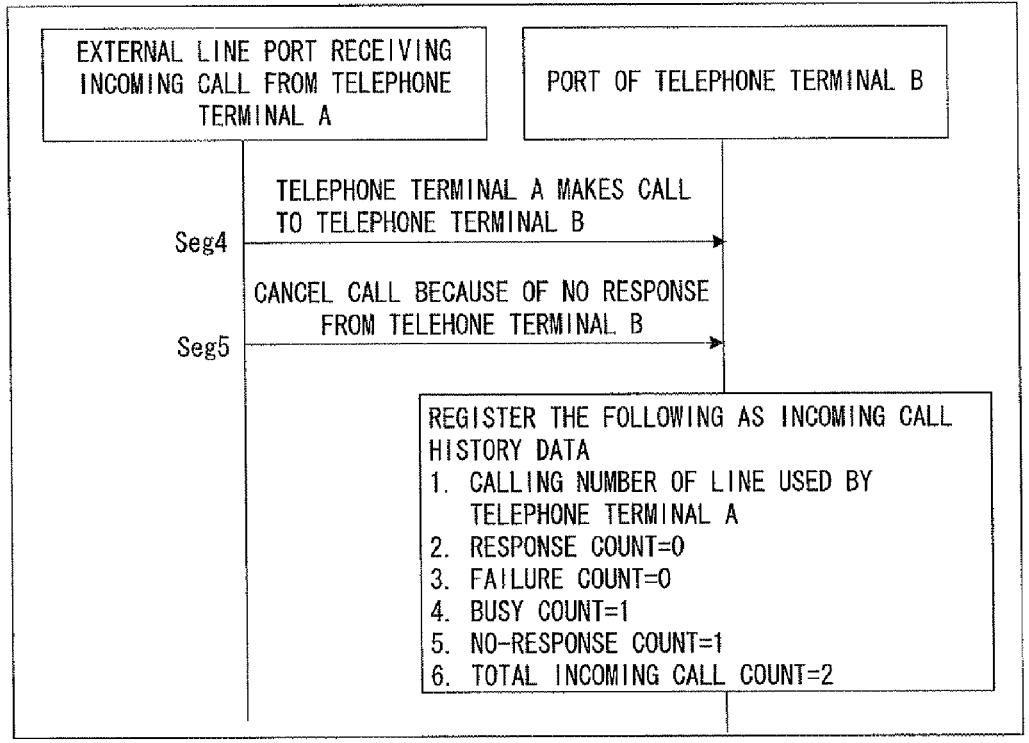
FIG. 4B is a sequence diagram illustrating an operation of recording incoming call history data when the incoming call operations shown in FIGS. 2A to 2C are performed in the telephone exchange system shown in FIG. 1.
Figure 4C:
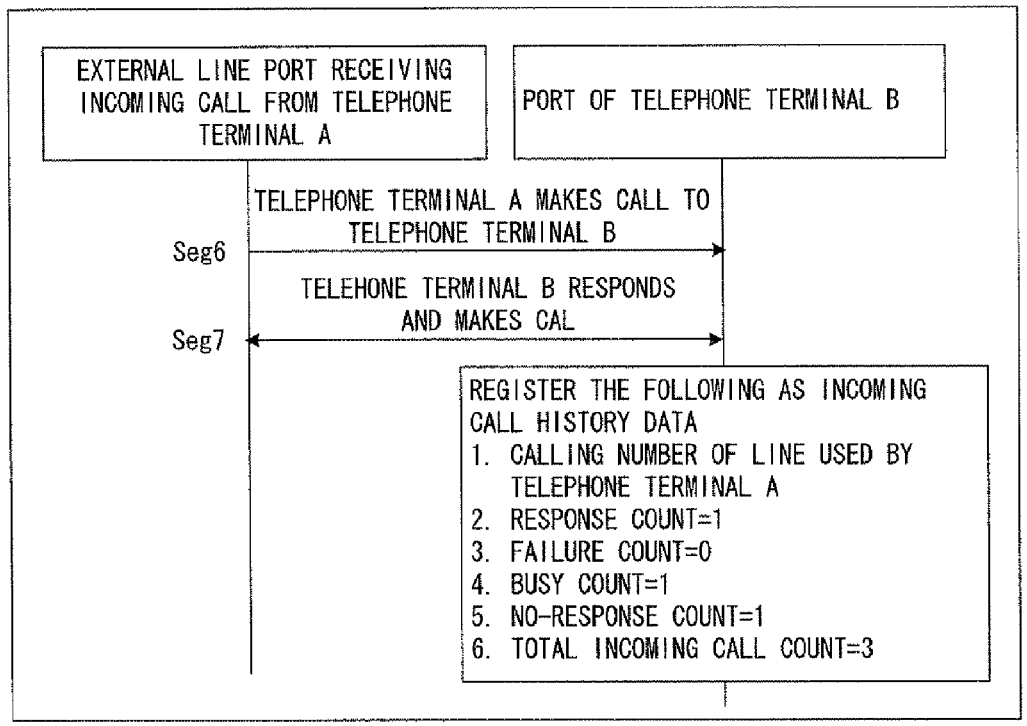
FIG. 4C is a sequence diagram illustrating an operation of recording incoming call history data when the incoming call operations shown in FIGS. 2A to 2C are performed in the telephone exchange system shown in FIG. 1.

In sum, in the incoming call history data 22B of the communication apparatus B 20B, the incoming call history data on the extension port of the telephone terminal B 30B is set as shown in FIG. 3B. That is, "2" indicating the second time is recorded as the total incoming call count (total number of incoming calls) indicating the total number of incoming calls, for the telephone terminal A 30A of the calling party, and "1" indicating the first time is recorded as the no-response count (the number of not-responded incoming calls) indicating the number of incomplete calls due to no response, as a communication type of the incoming call operation. As the other communication types, the busy count remains "1" as the counted-up value in the first incoming call operation, and the response count and the failure count remain the initial value "0".

Next, the third incoming call operation shown in FIG. 2C will be described. As shown in FIG. 4C, when a third incoming call is generated from the telephone terminal A 30A in the communication apparatus A to the telephone terminal B 30B in the communication apparatus B 20B via the external line port from the telephone terminal A 30A as the incoming call operation shown in FIG. 2C (sequence Seq6), the telephone incoming call control unit 21B of the communication apparatus B 20B prepares to transmit a call signal to the telephone terminal B 30B via the extension port of the telephone terminal B 30B.

Prior to the operation of transmitting the call signal to the telephone terminal B 30B, the telephone incoming call control unit 21B of the communication apparatus B 20B retrieves the incoming call history data from the telephone terminal A 30A on the telephone terminal B 30B in the incoming call history data 22B, and extracts the calling number (that is, the phone number specifying the telephone terminal A 30A of the calling party) of the line used by the telephone terminal A 30A, which is recorded as the incoming call history data from the telephone terminal A 30A of the calling party; total incoming call count="2"; and response count="0", failure count="0", busy count="1", and no-response count="1" as the communication types (breakdown) of the incoming call operation recorded as the breakdown of the total incoming call count. Further, the telephone incoming call control unit 21B transmits the extracted counts to the telephone terminal B 30B. After that, the telephone incoming call control unit 21B of the communication apparatus B 20B transmits a call signal to the telephone terminal B 30B.

In this case, when the user of the telephone terminal B 30B picks up the handset to answer the call signal from the communication apparatus B 20B, the telephone incoming call control unit 21B of the communication apparatus B 20B stops transmission of the call signal to the telephone terminal B 30B. The telephone incoming call control unit 21B of the communication apparatus B 20B transmits an answer signal to the communication apparatus A 20A to which the telephone terminal A 30A of the calling party is connected as a slave unit. The telephone incoming call control unit 21B of the communication apparatus B 20B connects the telephone terminal B 30B as the destination of the incoming call with the telephone terminal A 30A via the extension port of the telephone terminal B 30B and the external line port from the telephone terminal A, thereby bringing the telephone terminal B 30B into a communication state (sequence Seq7).

After that, the telephone incoming call control unit 21B of the communication apparatus B 20B records the calling number (that is, the phone number specifying the telephone terminal A 30A of the calling party) of the line used by the telephone terminal A 30A of the calling party, as data indicating the incoming call history from the telephone terminal A 30A, in an area of the incoming call history data 22B in which the number of incoming calls related to the telephone terminal B 30B is counted. The telephone incoming call control unit 21B of the communication apparatus B 20B increments, by "1", the total incoming call count "2" indicating the number of incoming calls from the telephone terminal A 30A of the calling party. The telephone incoming call control unit 21B of the communication apparatus B 20B increments, by "1", the response count "0" indicating the number of complete calls responded to the incoming calls from the telephone terminal A 30A of the calling party, as a communication type upon receiving an incoming call. Further, the telephone incoming call control unit 21B of the communication apparatus B 20B sets and registers the counts as "3" and "1", respectively. As the other communication types, the busy count and the no-response count remain "1" as the counted-up value in each of the first and second incoming call operations, and the failure count remains the initial value "0".

Figure 3C:
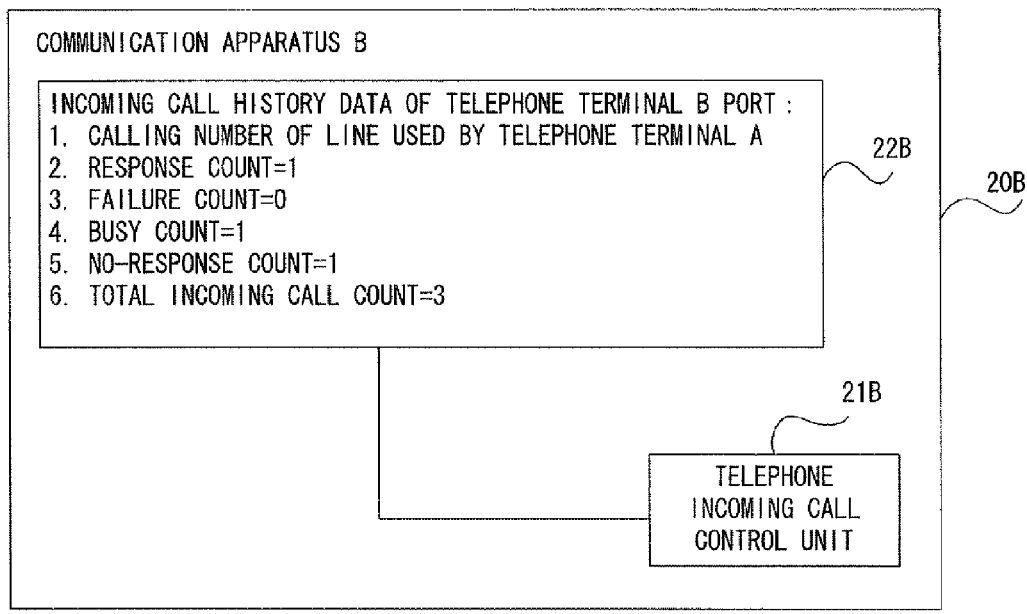
FIG. 3C is an explanatory diagram illustrating recorded contents of incoming call history data in the communication apparatus B when the incoming call operations shown in FIGS. 2A to 2C are performed in the telephone exchange system shown in FIG. 1.

In sum, in the incoming call history data 22B of the communication apparatus B 20B, the incoming call history data on the extension port of the telephone terminal B 30B is set as shown in FIG. 3C. That is, "3" indicating the third time is recorded as the total incoming call count (total number of incoming calls) indicating the total number of incoming calls, for the telephone terminal A 30A of the calling party, and "1" indicating the first time is recorded as the response count (the number of responded incoming calls) indicating the number of responded incoming calls, as a communication type of the incoming call operation. As the other communication types, the busy count and the no-response count remain "1" as the counted-up value in each of the first and second incoming call operations, and the failure count remains the initial value "0".

Figure 5A:
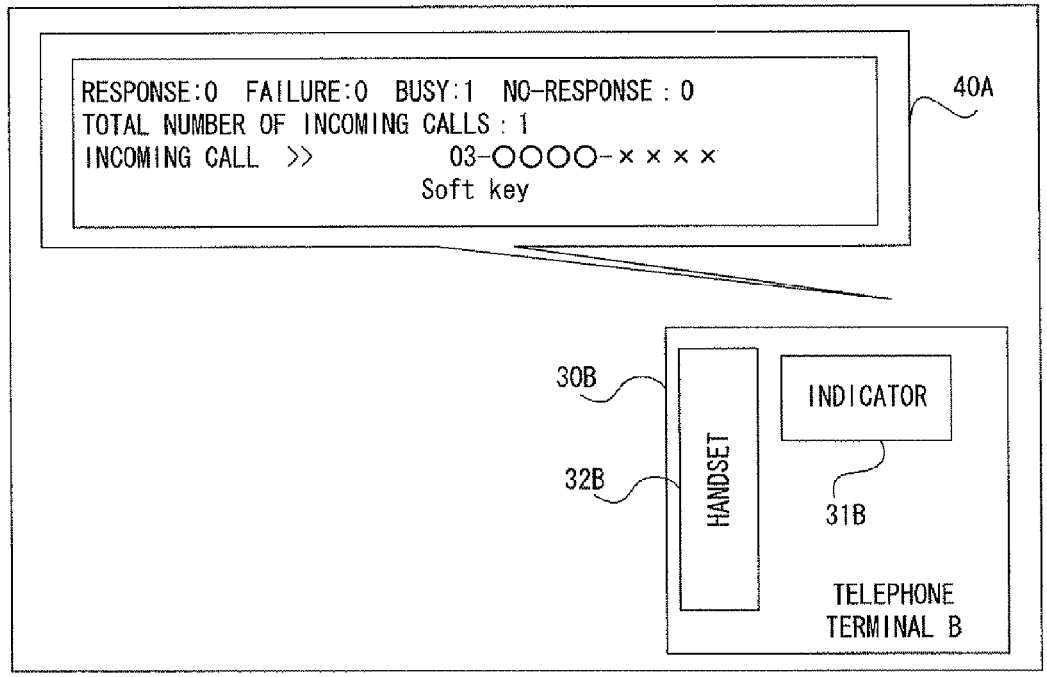
FIG. 5A is an explanatory diagram illustrating displayed contents of incoming call history data in the communication apparatus B when the incoming call operations shown in FIGS. 2A to 2C are performed in the telephone exchange system shown in FIG. 1.
Figure 5B:
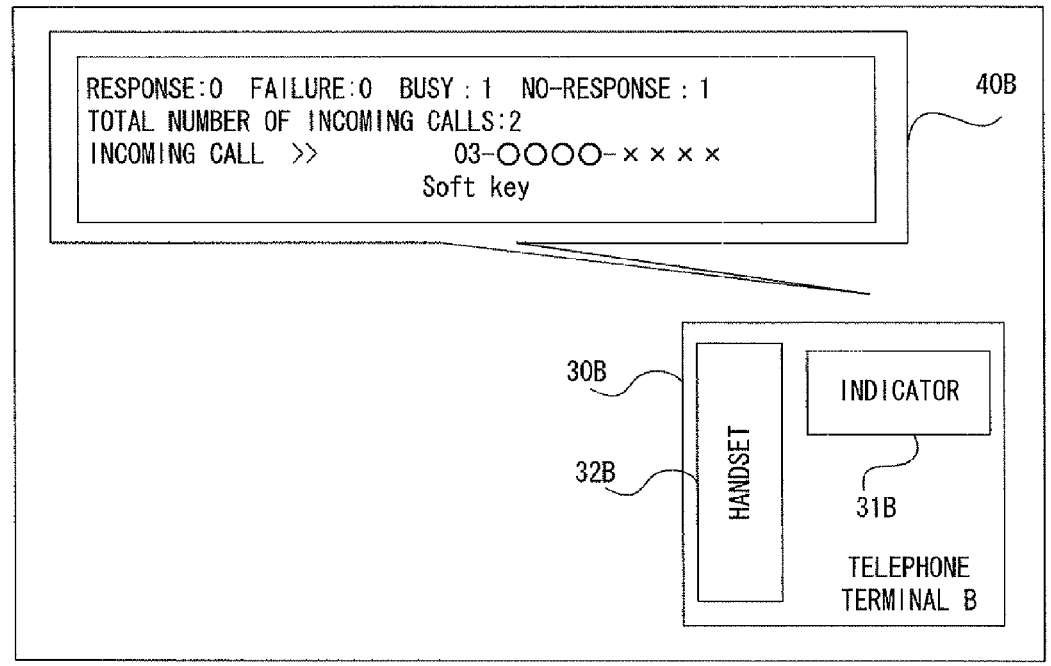
FIG. 5B is an explanatory diagram illustrating displayed contents of incoming call history data in the communication apparatus B when the incoming call operations shown in FIGS. 2A to 2C are performed in the telephone exchange system shown in FIG. 1.

Next, the operation of displaying the incoming call history data in the telephone terminal B 30B when three types of incoming call operations shown in FIGS. 2A to 2C are performed will be described with reference to FIGS. 5A and 5B. FIGS. 5A and 5B are explanatory diagrams illustrating displayed contents of the incoming call history data in the telephone terminal B 30B when the incoming call operations shown in FIGS. 2A to 2B are performed in the telephone exchange system shown in FIG. 1.

FIG. 5A shows a state where the incoming call history data transmitted to the telephone terminal B 30B prior to the call signal from the communication apparatus B 20B in the second incoming call operation shown in FIG. 2B is displayed on the indicator 31B. FIG. 5B shows a state where the incoming call history data transmitted to the telephone terminal B 30B prior to the call signal from the communication apparatus B 20B in the third incoming call operation shown in FIG. 2C is displayed on the indicator 31B. Note that in the first incoming call operation shown in FIG. 2A, the telephone terminal B 30B is not in an idle state (IDLE) but in a busy state (BUSY), unlike the second and third incoming call operations shown in FIGS. 2B and 2C. For this reason, the communication apparatus B 20B transmits neither incoming call history data nor call signal, and the operation of displaying incoming history data on the indicator 31B is not carried out in the telephone terminal B 30B.

First, a description is given of the displayed contents of the incoming call history data on the telephone terminal B in the second incoming call operation shown in FIG. 2B in which the first calling operation for the telephone terminal B 30B is performed. As described above, in the second incoming call operation shown in FIG. 2B, the telephone incoming call control unit 21B of the communication apparatus B 20B retrieves the incoming call history data from the telephone terminal A 30A on the telephone terminal B 30B of the incoming call history data 22B, prior to the operation of transmitting the call signal to the telephone terminal B 30B. Further, the telephone incoming call control unit 21B transmits, to the telephone terminal B 30B, the calling number (that is, the phone number specifying the telephone terminal A 30A of the calling party) of the line used by the telephone terminal A 30A, which is recorded as the incoming call history data from the telephone terminal A 30A of the calling party; total incoming call count="1"; and response count="0", failure count="0", busy count="1", and no-response count="0" as the communication types (breakdown) of the incoming call operation.

The telephone terminal B 30B having received the incoming call history data from the communication apparatus B 20B prior to the call signal edits the received incoming call history data, and displays the following contents as illustrated in an incoming call history display 40A shown in FIG. 5A, RESPONSE:0 FAILURE:0 BUSY:1 NON-RESPONSE:0 TOTAL NUMBER OF INCOMING CALLS:1 INCOMING CALL>>03-oooo-xxxx and the status of the incoming call history of the previous incoming calls from the telephone terminal A 30A to the telephone terminal B 30B, on the screen of the indicator 31B.

In the second incoming call operation, however, as described above, the telephone terminal B 30B is in the state of being unable to answer the call signal due to the absence of the user of the telephone terminal B 30B, for example. This makes it difficult to immediately utilize the status of the incoming call history displayed on the screen of the indicator 31B. In this case, if an answering machine function is effective, it is possible to edit the received incoming call history data into voice information to be recorded on an answering machine.

Next, a description is given of the displayed contents of the incoming call history data on the telephone terminal B 30B in the third incoming call operation shown in FIG. 2C in which the second calling operation for the telephone terminal B 30B is performed. As described above, in the third incoming call operation shown in FIG. 2C, the telephone incoming call control unit 21B of the communication apparatus B 20B retrieves the incoming call history data from the telephone terminal A 30A on the telephone terminal B 30B in the incoming call history data 22B, prior to the operation of transmitting the call signal to the telephone terminal B 30B. Further, the telephone incoming call control unit 21B transmits, to the telephone terminal B 30B, the calling number (that is, the phone number specifying the telephone terminal A 30A of the calling party) of the line used by the telephone terminal A 30A, which is recorded as the incoming call history data from the telephone terminal A 30A of the calling party; total incoming call count="2"; and response count="0", failure count="0", busy count="1", and no-response count="1" as the communication types (breakdown) of the incoming call operation.

The telephone terminal B 30B having received the incoming call history data from the communication apparatus B 20B prior to the call signal edits the received incoming call history data, and displays the following contents as illustrated in an incoming call history display 40B shown in FIG. 5B,
RESPONSE:0 FAILURE:0 BUSY:1 NON-RESPONSE:1
TOTAL NUMBER OF INCOMING CALLS:2
INCOMING CALL>>03-oooo-xxxx
and the status of the incoming call history of the previous incoming calls from the telephone terminal A 30A to the telephone terminal B 30B, on the screen of the indicator 31B.

Note that in the third incoming call operation, as described above, the user of the telephone terminal B 30B picks up the handset 32B to answer the call signal from the communication apparatus B 20B. This allows the user to be prepared to make a response to the incoming call from the user of the telephone terminal A 30A of the calling party before answering the call, by referring to the status of the incoming call history displayed on the screen of the indicator 31B prior to the call signal.

Figure 6:
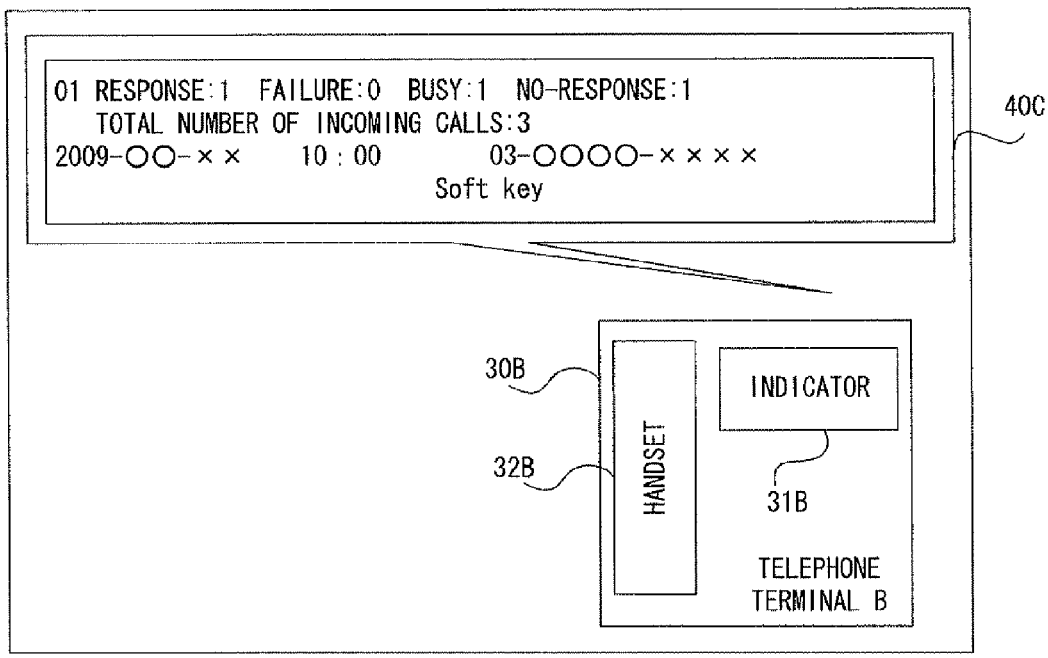
FIG. 6 is an explanatory diagram illustrating an example in which incoming call history data on the telephone terminal B is transferred from the communication apparatus B and displayed on a screen in response to a reference request from the telephone terminal B in the telephone exchange system shown in FIG. 1.

Note that the user of the telephone terminal B 30B may obtain, at any time, the incoming call history data on the telephone terminal B 30B in the incoming call history data 22B recorded in the communication apparatus B 20B and may display the obtained data on the screen of the indicator 31B. FIG. 6 is an explanatory diagram illustrating an example in which the incoming call history data on the telephone terminal B 30B is transferred from the communication apparatus B 20B and is displayed on the screen of the indicator 31B in response to a reference request from the telephone terminal B 30B in the telephone exchange system shown in FIG. 1. FIG. 6 illustrates a screen display example of the incoming call history data at the time when the communication in the third incoming call operation shown in FIGS. 2A to 2C is completed.

Specifically, for example, at the time when the communication between the telephone terminal B 30B and the telephone terminal A 30A of the calling party in the third incoming call operation shown in FIGS. 2A to 2C is completed, the user of the telephone terminal B 30B transmits a reference request for the incoming call history data on the telephone terminal A 30A of the calling party in the incoming call history data 22B recorded in the communication apparatus B 20B, to the communication apparatus B 20B from the telephone terminal B 30B. The telephone incoming call control unit 21B of the communication apparatus B 20B having received the reference request retrieves the incoming call history data from the telephone terminal A 30A on the telephone terminal B 30B of the incoming call history data 22B in response to the reference request. Further, the telephone incoming call control unit 21B extracts the calling number (that is, the phone number specifying the telephone terminal A 30A of the calling party) of the line used by the telephone terminal A 30A recorded as the incoming call history data from the telephone terminal A 30A of the calling party; incoming call date and time="2009-oo-xx 10:00" of the incoming call in the latest communication; total incoming call count="3"; and response count="1", failure count="0", busy count="1", no-response count="1" as the communication types (breakdown) of the incoming call operation. Then, the telephone incoming call control unit 21B returns the extracted counts to the requesting telephone terminal B 30B.

The telephone terminal B 30B having received the incoming call history data from the communication apparatus B 20B as return data for the reference request edits the received incoming call history data, and displays the following contents as illustrated in an incoming call history display 40C shown in FIG. 6,
01 RESPONSE:1 FAILURE:0 BUSY:1 NON-RESPONSE:1
TOTAL NUMBER OF INCOMING CALLS:3
2009-oo-xx 10:00 03-oooo-xxxx
and the status of the incoming call history of the previous incoming calls from the telephone terminal A 30A to the telephone terminal B 30B, on the screen of the indicator 31B.

In this manner, the user of the telephone terminal B 30B can make reference to the incoming call history data on the incoming calls from an arbitrarily designated calling party to the telephone terminal B 30B at any time.

Moreover, the user of the telephone terminal B 30B can rewrite, at any time, the incoming call configuration data 23B in the communication apparatus B 20B connected with the telephone terminal B 30B. Such rewrite processing enables control of the operation of counting the number of incoming calls in the telephone incoming call control unit 21B of the communication apparatus B 20B.

For example, the set period in which the number of previous incoming calls is counted for each telephone terminal B 30B may be limited such that only the incoming calls during the period of the previous one hour or the current day is counted. The entire period from the start of the system operation as the communication apparatus B 20B to the present time may be set. A period from an arbitrarily designated start date to an arbitrarily designated end date may be set. Alternatively, the telephone terminal B 30B may transmit a reset instruction at any time for each telephone terminal B 30B to reset and recount the number of previous incoming calls from "1". More alternatively, a calling party may be designated as a target for resetting the number of incoming calls. At least one of the total number of incoming calls, the number of incoming calls for each communication type (breakdown of the incoming call operation), and the like may be arbitrarily selected and designated.

As the communication types (breakdown of the incoming call operation) indicating the number of incoming calls to be displayed on the indicator 31B of the telephone terminal B 30B, only the total number of incoming calls may be displayed, without displaying the number of incoming calls for each communication type indicating the breakdown of the incoming call operation. Both the total number of incoming calls and the number of busy incoming calls may be displayed. It is also possible to set the total number of incoming calls and the breakdown of all incoming call operations (the number of busy incoming calls, the number of failure incoming calls, the number of not-responded incoming calls, the number of responded incoming calls, and the like) to be displayed.

Explanation of Advantageous Effects of Exemplary Embodiment

As described above in detail, this exemplary embodiment provides the following advantageous effects.

According to this exemplary embodiment, there is provided a configuration in which regardless of conditions, such as a busy state, handset off-hook, failure, absence, and the like, the number of incoming calls from each calling party in a previous period arbitrarily set by a user of each telephone terminal, as well as communication types indicating the breakdown of an incoming call operation, is counted for each telephone terminal, as the number of incoming calls. Further, upon arrival of an incoming call from a certain calling party to a telephone terminal, the number of incoming calls from the calling party of the counting target, as well as the number of incoming calls for each communication type indicating the breakdown of the incoming call operation, is displayed on the telephone terminal, before the user of the telephone terminal answers the call. This configuration enables the user of the telephone terminal to instantly confirm the number of previous incoming calls from the same calling party during the busy state or in the absence of the user, before answering the call. This allows the user to make a response with an apology like "I'm sorry you've had trouble contacting us", which eases the frustration of the calling party.

Further, according to this exemplary embodiment, there is provide a configuration in which regardless of conditions, such as a busy state, handset off-hook, failure, absence, and the like, the number of incoming calls from each calling party in a previous period arbitrarily set by a user of each telephone terminal is counted for each telephone terminal, as the number of incoming calls. Further, upon arrival of an incoming call from a certain calling party to the telephone terminal, the number of incoming calls from the calling party of the counting target is displayed on the telephone terminal before the user of the telephone terminal answers the call. This configuration enables the user of the telephone terminal to instantly determine whether the calling party has made the telephone incoming call for the first time. This allows the user to be prepared to make a response in consideration of the possibility of an inquiry or an order from a new client, for example.

Moreover, according to this exemplary embodiment, there is provided a configuration in which regardless of conditions, such as a busy state, handset off-hook, failure, absence, and the like, the number of incoming calls from each calling party in a previous period arbitrarily set by a user of each telephone terminal, as well as the number of incoming calls for each communication type indicating the breakdown of the incoming call operation, is counted for each telephone terminal, as the number of incoming calls. Further, upon arrival of an incoming call from a certain calling party to a telephone terminal, the number of incoming calls from the calling party of the counting target, as well as the number of incoming calls for each communication type indicating the breakdown of the incoming call operation, is displayed on the telephone terminal, before the user of the telephone terminal answers the call. This configuration enables the calling party to confirm, before answering the call, if the calling party is not a new calling party but has previously called and made a telephone conversation, even when the calling party is not registered in the telephone directory of the telephone terminal because the number of the previous incoming call from the calling party is small. This allows the user to be prepared to make a response with a greeting message, for example.

Exemplary configurations according to exemplary embodiments of the present invention have been described above. It should be understood, however, that these exemplary embodiments are merely exemplary of the present invention and the present invention is not particularly limited by these exemplary embodiments. Those skilled in the art can easily understand that various modifications can be made for specific applications without departing from the scope of the present invention. For example, in addition to the configuration (1) described in the "Solution to Problem" section, exemplary embodiments of the present invention can also be expressed as the following configurations.

(2) The telephone exchange system according to the configuration (1), wherein upon receiving a reference request for the incoming call history data from the telephone terminal, the communication apparatus transmits the incoming call history data on the telephone terminal to the telephone terminal requesting the incoming call history data.

(3) The telephone exchange system according to the configuration (1) or (2), wherein the telephone terminal includes an indicator that displays various information, and upon receiving the incoming call history data on the calling party from the communication apparatus, the telephone terminal displays the received incoming call history data on the indicator.

(4) The telephone exchange system according to any one of the configurations (1) to (3), wherein the number of incoming calls for each communication type forming the incoming call history data includes at least one of: the number of busy incoming calls indicating the number of denied incoming calls due to a busy state of the telephone terminal; the number of failure incoming calls indicating the number of denied incoming calls due to a failure or handset off-hook of the telephone terminal; the number of not-responded incoming calls indicating the number of incomplete calls due to a failure of response within a predetermined period; and the number of responded incoming calls indicating the number of incoming calls responded by the telephone terminal.

(5) The telephone exchange system according to any one of the configurations (1) to (4), wherein the communication apparatus includes incoming call configuration data for controlling an operation of recording incoming call history data for each of the telephone terminals, the incoming call configuration data being arbitrarily configurable and changeable by a user of the telephone terminal.

(6) The telephone exchange system according to the configuration (5), wherein the incoming call configuration data of the communication apparatus includes at least one of: configuration data for specifying a period in which the number of previous incoming calls is counted; configuration data for specifying each type of the incoming call history data to be transmitted to the telephone terminal; and configuration data for specifying whether or not to reset the number of previous incoming calls in the incoming call history data based on an instruction from the telephone terminal.

(7) A communication apparatus that controls communication between telephone terminals each connected as a slave unit, wherein the communication apparatus includes incoming call history data storing the total number of incoming calls and the number of incoming calls for each communication type indicating a breakdown of an incoming call operation, for each of the telephone terminals, and upon detecting an incoming call for the telephone terminal from a certain calling party, the communication apparatus retrieves the incoming call history data on the telephone terminal prior to an operation of transmitting a call signal to the telephone terminal, extracts incoming call history data on the calling party from which the telephone terminal has received the incoming call, transmits the incoming call history data to the telephone terminal when the telephone terminal is in an idle state, and transmits the call signal to the telephone terminal.

(8) The communication apparatus according to the configuration (7), wherein upon receiving a reference request for the incoming call history data from the telephone terminal, the incoming call history data on the telephone terminal is transmitted to the telephone terminal requesting the incoming call history data.

(9) The communication apparatus according to the configuration (7) or (8), wherein the number of incoming calls for each communication type forming the incoming call history data includes at least one of: the number of busy incoming calls indicating the number of denied incoming calls due to a busy state of the telephone terminal; the number of failure incoming calls indicating the number of denied incoming calls due to a failure or handset off-hook of the telephone terminal; the number of not-responded incoming calls indicating the number of incomplete calls due to no response of the telephone terminal within a predetermined period; and the number of responded incoming calls indicating the number of incoming calls responded by the telephone terminal.

(10) The communication apparatus according to any one of the configurations (7) to (9), wherein the communication apparatus includes incoming call configuration data for controlling an operation of recording the incoming call history data for each of the telephone terminals, the incoming call configuration data being arbitrarily configurable and changeable by a user of the telephone terminal.

(11) The communication apparatus according to the configuration (10), wherein the incoming call configuration data includes at least one of: configuration data for specifying a period in which the number of previous incoming calls is counted; configuration data for specifying each type of the incoming call history data to be transmitted to the telephone terminal; and configuration data for specifying whether or not to reset the number of previous incoming calls in the incoming call history data based on an instruction from the telephone terminal.

(12) The communication apparatus according to any one of the configurations (7) to (11), wherein the communication apparatus is one of a key telephone unit and a private branch exchange (PBX) system.

(13) A telephone incoming call method in a telephone exchange system comprising a communication apparatus that controls communication between telephone terminals each connected as a slave unit, and the telephone terminals, the method comprising: recording, by the communication apparatus, the total number of incoming calls and the number of incoming calls for each communication type indicating a breakdown of an incoming call operation, for each of the telephone terminals, as incoming call history data; retrieving, by the communication apparatus, the incoming call history data on the telephone terminal, prior to an operation of transmitting a call signal to the telephone terminal, upon detecting an incoming call from a certain calling party to the telephone terminal; extracting, by the communication apparatus, incoming call history data on the calling party from which the telephone terminal has received the incoming call, and transmitting the incoming history data to the telephone terminal when the telephone terminal is in an idle state; and transmitting, by the communication apparatus, the call signal to the telephone terminal.

(14) The telephone incoming call method according to the configuration (13), wherein upon receiving a reference request for the incoming call history data from the telephone terminal, the communication apparatus transmits the incoming call history data on the telephone terminal to the telephone terminal requesting the incoming call history data.

(15) The telephone incoming call method according to the configuration (13) or (14), wherein the number of incoming calls for each communication type forming the incoming call history data includes at least one of: the number of busy incoming calls indicating the number of denied incoming calls due to a busy state of the telephone terminal; the number of failure incoming calls indicating the number of denied incoming calls due to a failure or handset off-hook of the telephone terminal; the number of not-responded incoming calls indicating the number of incomplete calls due to no response of the telephone terminal within a predetermined period; and the number of responded incoming calls indicating the number of incoming calls responded by the telephone terminal.

(16) The telephone incoming call method according to any one of the configurations (13) to (15), wherein the communication apparatus includes incoming call configuration data for controlling an operation of recording the incoming call history data for each of the telephone terminals, the incoming call configuration data being arbitrarily configurable and changeable by a user of the telephone terminal.

(17) The telephone incoming call method according to the configuration (16), wherein the incoming call configuration data of the communication apparatus includes at least one of: configuration data for specifying a period in which the number of previous incoming calls is counted; configuration data for specifying each type of the incoming call history data to be transmitted to the telephone terminal; and configuration data for specifying whether or not to reset the number of previous incoming calls in the incoming call history data based on an instruction from the telephone terminal.

(18) A telephone incoming call program for causing a computer to execute the telephone incoming call method according to any one of the configurations (13) to (17) as an executable program.

(19) A program recording medium storing the telephone incoming call program according to the above configuration (18) in a computer readable recording medium.

Although the above exemplary embodiments of the present invention are illustrated as a hardware configuration, the present invention is not limited thereto. The present invention may also be implemented by causing a central processing unit (CPU) to execute arbitrary processing as a computer program.

The program can be stored and provided to a computer using any type of non-transitory computer readable media. Non-transitory computer readable media include any type of tangible storage media. Examples of non-transitory computer readable media include magnetic storage media (such as flexible disks, magnetic tapes, and hard disk drives), optical magnetic storage media (such as magneto-optical disks), CD-ROM (Read Only Memory), CD-R, CD-R/W, and semiconductor memories (such as mask ROM, PROM (Programmable ROM), EPROM (Erasable PROM), flash ROM, and RAM (Random Access Memory)). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

This application is based upon and claims the benefit of priority from Japanese patent application No. 2009-253573, filed on Nov. 5, 2009, the disclosure of which is incorporated herein in its entirety by reference.

REFERENCE SIGNS LIST

10 PUBLIC NETWORK
20A COMMUNICATION APPARATUS A
20B COMMUNICATION APPARATUS B
20C COMMUNICATION APPARATUS C
21A TELEPHONE INCOMING CALL CONTROL UNIT
21B TELEPHONE INCOMING CALL CONTROL UNIT
21C TELEPHONE INCOMING CALL CONTROL UNIT
22A INCOMING CALL HISTORY DATA
22B INCOMING CALL HISTORY DATA
22C INCOMING CALL HISTORY DATA
23A INCOMING CALL CONFIGURATION DATA
23B INCOMING CALL CONFIGURATION DATA
23C INCOMING CALL CONFIGURATION DATA
30A TELEPHONE TERMINAL A
30B TELEPHONE TERMINAL B
30C TELEPHONE TERMINAL C
31A INDICATOR
31B INDICATOR
31C INDICATOR
32A HANDSET
32B HANDSET
32C HANDSET
40A INCOMING CALL HISTORY DISPLAY
40B INCOMING CALL HISTORY DISPLAY
40C INCOMING CALL HISTORY DISPLAY

The invention claimed is:

1. A telephone exchange system comprising:
a communication apparatus that controls communication between telephone terminals each connected as a unit; and
the telephone terminals, wherein
the said communication apparatus includes incoming call history data storing the number of busy incoming calls indicating the number of denied incoming calls due to a busy state of the telephone terminal, for each of the telephone terminals,
upon detecting an incoming call from a calling party to the telephone terminal, prior to an operation of transmitting an incoming call signal to the said telephone terminal, the said communication apparatus retrieves the incoming call history data on the said telephone terminal and extracts history data of the incoming calls from the said calling party to the said telephone terminal, and when the said telephone terminal is in an idle state, the said communication apparatus transmits the extracted history data of the said calling party to the said telephone terminal and
transmits the incoming call signal to the said telephone terminal.

2. The telephone exchange system according to claim 1, wherein upon receiving from the telephone terminal a reference request for the incoming call history data, the said communication apparatus transmits the incoming call history data on the telephone terminal to the telephone terminal requesting the incoming call history data.

3. The telephone exchange system according to claim 1 wherein
the telephone terminal includes an indicator that displays various information, and
upon receiving from the communication apparatus incoming call history data of the calling party, the telephone terminal displays the received incoming call history data on the indicator.

4. The telephone exchange system according to claim 1, wherein the incoming call history data further includes the number of incoming call failures which indicate the number of incoming calls denied due to a failure or handset off-hook of the telephone terminal.

5. The telephone exchange system according to claim 1, wherein the communication apparatus includes incoming call configuration data which controls an operation of recording the incoming call history data for each of the telephone terminals, the incoming call configuration data being arbitrarily configurable and changeable by a user of the telephone terminal.

6. A telephone exchange system according to claim 5, wherein the incoming call configuration data of the communication apparatus includes at least one of: configuration data which specifies a period in which the number of previous incoming calls is counted; configuration data which specifies each type of the incoming call history data to be transmitted to the telephone terminal; and configuration data which specifies whether or not to reset the number of previous incoming calls in the incoming call history data based on an instruction from the telephone terminal.

7. A communication apparatus that includes at least a telephone incoming call control unit, incoming call history data and incoming call configuration data, where the said communication apparatus controls communication between telephone terminals each connected as a unit, and the telephone incoming call control unit includes hardware wherein
the telephone incoming call control unit controls incoming call history data storing the number of busy incoming calls which indicate the number of denied incoming calls due to a busy state of the telephone terminal, for each of the telephone terminals, and
upon detecting an incoming call from a calling party to the telephone terminal, prior to an operation of transmitting an incoming call signal to the telephone terminal, the telephone incoming call control unit retrieves the incoming call history data on the telephone terminal,
the telephone incoming call control unit extracts history data of the incoming calls from the calling party to the said telephone terminal, and when the telephone terminal is in an idle state, transmits the extracted history data of the incoming calls from the calling party to the telephone terminal, and
the telephone incoming call control unit transmits the incoming call signal to the telephone terminal.

8. The communication apparatus according to claim 7, wherein upon receiving a reference request for the incoming call history data from the telephone terminal, the communication apparatus transmits the incoming call history data on the telephone terminal to the requesting telephone terminal.

9. The communication apparatus according to claim 7, wherein the incoming call history data further includes the number of incoming call failures which indicate the number of incoming calls denied due to a failure or a handset of the telephone terminal being off-hook.

10. The communication apparatus according to claim 7, wherein the communication apparatus includes incoming call configuration data to control an operation of recording incoming call history data for each of the telephone terminals, the incoming call configuration data being arbitrarily configurable and changeable by a user of the telephone terminal.

11. The communication apparatus according to claim 10, wherein the incoming call configuration data includes at least one of: configuration data which specifies a period in which the number of previous incoming calls is counted; configuration data which specifies each type of the incoming call history data to be transmitted to the telephone terminal; and configuration data which specifies whether or not to reset the number of previous incoming calls in the incoming call history data, based on an instruction from the telephone terminal.

12. The communication apparatus according to claim 7, wherein the communication apparatus is one of a key telephone unit and a private branch exchange (PBX) system.

13. A telephone incoming call method in a telephone exchange system comprising a communication apparatus that controls communication between telephone terminals each connected as a unit, and the telephone terminals, the method comprising:
   recording, by the communication apparatus, the number of busy incoming calls which indicates the number of incoming calls denied due to a busy state of the telephone terminal, for each of the telephone terminals, as incoming call history data;
   upon detecting an incoming call from a calling party to the telephone, retrieving, prior to an operation of transmitting a call signal to the telephone terminal by the communication apparatus, the incoming call history data on the telephone terminal;
   extracting, by the communication apparatus, incoming call history data from which the telephone terminal has received the incoming call, from the incoming call history data on the telephone terminal, and when the telephone terminal is in an idle state, transmitting the extracted incoming call history data of the calling party to the said telephone terminal; and
   transmitting, by the said communication apparatus, the call signal to the telephone terminal.

14. The telephone incoming call method according to claim 13, wherein upon receiving a reference request for the incoming call history data from the telephone terminal, the communication apparatus transmits to the telephone terminal requesting the incoming call history data, the incoming call history data on the telephone terminal.

15. The telephone incoming call method according to claim 13, wherein the incoming call history data further includes the number of incoming call failures which indicate the number of denied incoming calls due to a failure or handset of the telephone terminal being off hook.

16. The telephone incoming call method according to claim 13, wherein the communication apparatus includes incoming call configuration data which controls an operation of recording the incoming call history data for each of the telephone terminals, the incoming call configuration data being arbitrarily configurable and changeable by a user of the telephone terminal.

17. The telephone incoming call method according to claim 16, wherein the incoming call configuration data of the communication apparatus includes at least one of: configuration data which specifies a period in which the number of previous incoming calls is counted; configuration data which specifies each type of the incoming call history data to be transmitted to the telephone terminal; and configuration data which specifies whether or not to reset the number of previous incoming calls in the incoming call history data based on an instruction from the telephone terminal.

18. A non-transitory computer readable medium storing a telephone incoming call program for causing a computer to execute the telephone incoming call method according to claim 13 as an executable program.

\* \* \* \* \*